C. A. DILLON.
FABRIC CLEANING APPARATUS.
APPLICATION FILED DEC. 29, 1911.
1,291,440.
Patented Jan. 14, 1919.
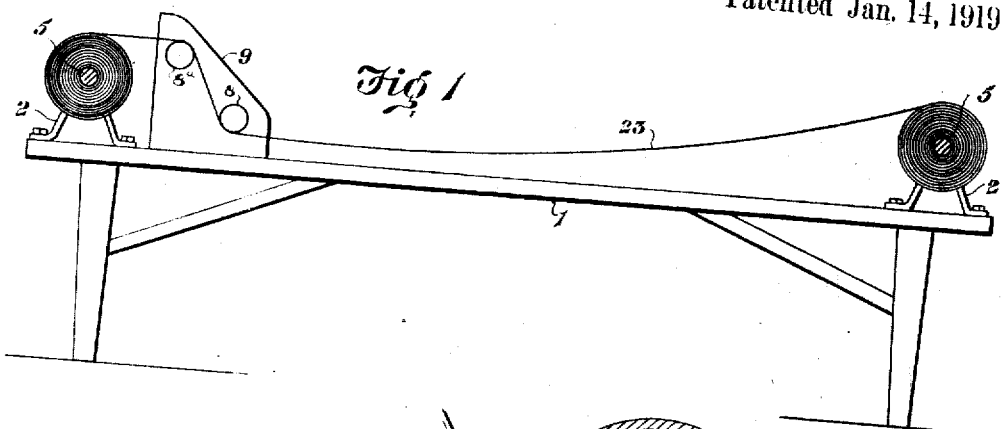
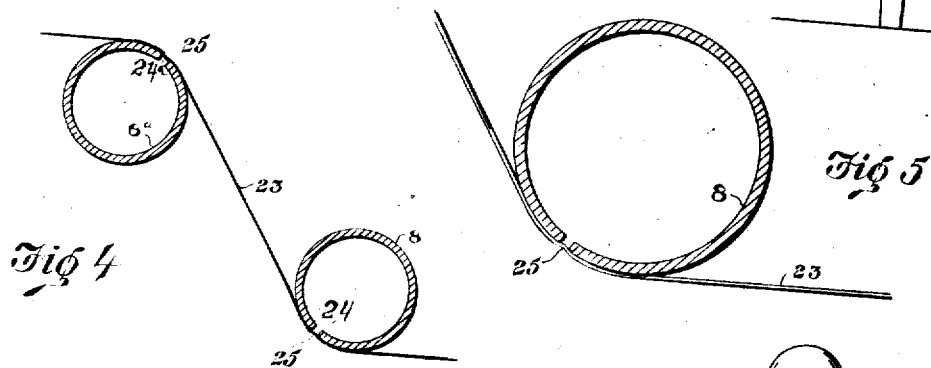
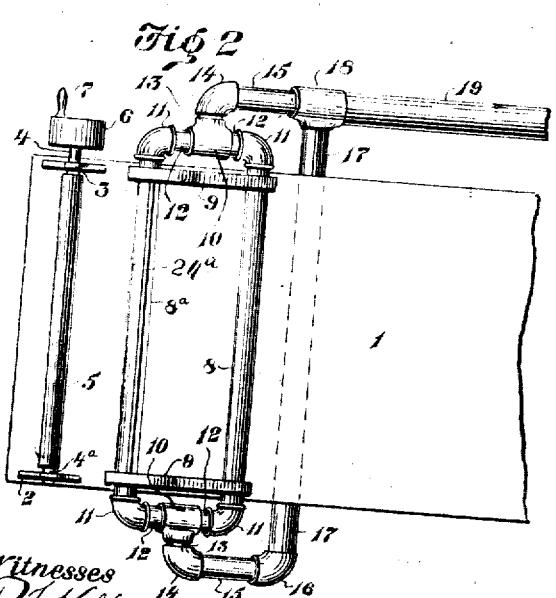
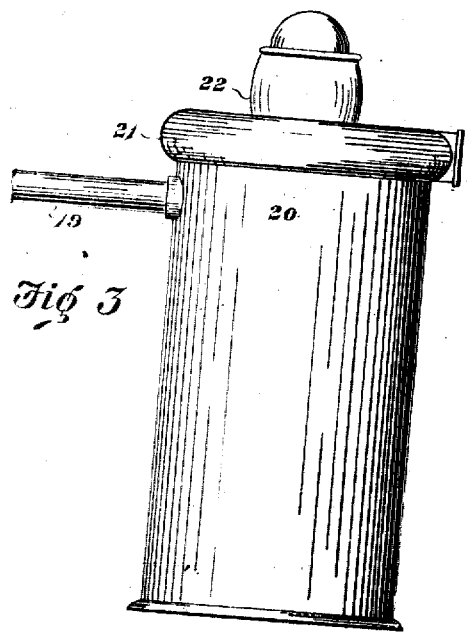
Witnesses
R. A. Kohl
Ruth A. Miller
Inventor
Charles A. Dillon
By Harry Frease
Attorney

UNITED STATES PATENT OFFICE.

CHARLES A. DILLON, OF CANTON, OHIO, ASSIGNOR TO THE UNITED ELECTRIC COMPANY, OF CANTON, OHIO, A CORPORATION OF OHIO.

FABRIC-CLEANING APPARATUS.

1,291,440.

Specification of Letters Patent.

Patented Jan. 14, 1919.

Application filed December 29, 1911. Serial No. 668,531.

*To all whom it may concern:*

Be it known that I, CHARLES A. DILLON, a citizen of the United States, residing at Canton, in the county of Stark and State of Ohio, have invented a certain new and useful Fabric-Cleaning Apparatus, of which the following is a specification.

The invention relates to a process of and apparatus for cleaning strips or long sheets of fabric by the so-called suction or vacuum method, and the object of the improvement is to thoroughly remove all separable dust and dirt from the fabric by a single or continuous operation.

In the manufacture of rubber tires, a lamina of rubber composition, colloquially called "friction," containing more or less sulfur, is cured by enveloping and compressing between the plies of a closely woven fabric, as of cloth or canvas, rolled into a spiral pack; and, as a result of this curing process, a considerable amount of sulfur is secreted from the composition and is taken up by the cloth or canvas, wherein it adheres and dries in the form of a sulfurous dust which must be removed from the fabric before the same can be efficiently used for a repetition of the curing process. The sulfurous powder adheres quite tenaciously in the pores or interstices of the fabric, and it is practically impossible to completely remove it by ordinary means.

The present invention has been devised more particularly for the purpose of cleaning or removing the sulfurous dust adhering to the cloth or canvas as a result of such a rubber curing process, and has been successfully used in this connection; but it is not intended to limit the scope of the invention to such particular use, for it is evident that the improved process and apparatus can as well be used for cleaning any kind of separable dirt or dust from any kind of cloth or fabric, as, for instance, cotton, woolen, silken or other cloths, felts, carpets and the like.

The purposes of the invention, thus set forth in general terms, are attained by passing the fabric, preferably from one roll to another, around the side of a transverse tube having a longitudinal suction slot in its contact side, and then proximately around the opposite side of a similar transverse adjacent tube having a longitudinal suction slot in its contact side; whereby the suction of the first slot not only draws all separable dust from the fabric in one direction, but deflects the fabric into the slot, thus stretching it on one side and compressing it on the other side and loosening the dust therein, and the suction through the second slot removes the remaining dust by drawing it from the fabric in the opposite direction, thereby thoroughly and completely cleaning the fabric from all separable dust.

A simple, and therefore a preferred embodiment of the invention, thus set forth in general terms, is illustrated in the accompanying drawing, forming part hereof, in which—

Figure 1 is a side elevation of a table showing the apparatus in longitudinal section mounted thereon;

Fig. 2, a plan view of one end of the table showing the suction tubes and the adjacent roller;

Fig. 3, an outline view of a preferred form of dust collecting apparatus;

Fig. 4, a fragmentary sectional view showing the general arrangement of the two suction tubes; and Fig. 5, a sectional view of one tube showing the deflection of the fabric in the suction slot thereof.

Similar numerals refer to similar parts throughout the drawing.

Upon the ends of the table 1 are mounted suitable brackets 2 in which are formed journal bearings 3 for the axial pivots 4 and 4ª on the ends of the spindles 5, one or both of which pivots may be extended and supplied with a pulley wheel 6 having a handle 7 for either power or manual operation.

The suction tubes 8 and 8ª are transversely supported adjacent to each other on the table by suitable brackets as 9, the ends of the tubes being connected to the T's 10 by means of the elbows 11 and nipples 12 which in turn are connected by the nipples 13, the elbows 14, the pipes 15 and on one side with the elbow 16 and the transverse pipe 17 to a junction with the T 18 and thence by the main pipe 19 to a connection with the separating chamber 20 of a dust collecting apparatus which, as shown, preferably includes a fan blower 21 and an electric motor 22.

The transverse tubes 8 and 8ª are preferably located parallel with the spindle at the forward end of the table, and the forward tube 8ᵃ is preferably located above and the rearward tube 8 below the plane of the spindles; thus positioning the tubes in a plane extending diagonally upward and forward across the plane of the spindles. The fabric 23 to be cleaned is first wound on the spindle 5 at the rear end of the table, whence the free end of the fabric is carried forward under the rearward tube and thence upward and over the forward tube and thence is wound upon the forward spindle.

The suction tubes 8 and 8ᵃ are each provided with longitudinal slots 24 and 24ᵃ, the same being located in the under side of the rearward tube 8 and in the upper side of the forward tube 8ᵃ, to bring the slots on opposite sides of the plane of the tubes in such position that the fabric will extend across and cover the slots when passed around the tubes.

The slots are preferably made by sawing or milling longitudinal kerfs in the sides of the tubes and are preferably about one-tenth of an inch wide in a two inch tube for cleaning a comparatively thin tube for clean- which width of slot and size of tube may be varied for fabrics of different kinds and thickness; and the outer edges of the slots are preferably slightly rounded to prevent a scraping or cutting of the fabric thereby.

In operation of the apparatus for cleaning the fabric, the same is drawn from the rear spindle by a rotation of the forward spindle, and, in so doing, passes around the suction tubes and across the suction slots therein: and, the suction cleaning machine being placed in operation, a strong suction is created in the tubes which forcefully draws the air inward through the slots and necessarily through the portion of the fabric which extends across the slots, which sucks into the tube all free dust there may be in the fabric.

The same suction furthermore draws or deflects inward that portion of the fabric which extends across the slot, as indicated at 25 in Figs. 4 and 5, which deflection bends the fabric in the form of two reverse curves, and serves to alternately bend the fabric successively in three directions and to alternately stretch and then compress the opposite sides thereof thereby loosening the dust adhering to the fabric.

It is evident that, as the fabric passes the suction slot of the one tube, the free dust will be drawn through and from the fabric from one side to the other and at the same time the fabric will be so bent in reverse directions as to further loosen the dust therein; and that, as the fabric then passes immediately across the suction slot in the other tube, the dust which has been loosened by the bending while passing across the first slot will be drawn through and from the fabric in the opposite direction at the same time the fabric is being again deflected or bent in reverse directions to further loosen the dust therein, whereby all dust is not only loosened but removed from both sides of the fabric.

I claim:

A fabric cleaning apparatus including a plurality of parallel suction tubes having longitudinal slots therein and means for passing opposite sides of the fabric in proximate succession over the slots in contact with the lips thereof, whereby the fabric is deflected and bent reversely inward between the lips by the air passing into the slots through the bends of the fabric.

CHARLES A. DILLON.

Witnesses:
RUTH A. MILLER,
FERD J. ZETTLER.